United States Patent
Arimura

(10) Patent No.: US 7,572,541 B2
(45) Date of Patent: Aug. 11, 2009

(54) FUEL CELL

(75) Inventor: Tomoaki Arimura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 801 days.

(21) Appl. No.: 11/285,666

(22) Filed: Nov. 22, 2005

(65) Prior Publication Data

US 2006/0141297 A1    Jun. 29, 2006

(30) Foreign Application Priority Data

Dec. 27, 2004    (JP)    ............... 2004-376449

(51) Int. Cl.
*H01M 4/86* (2006.01)
(52) U.S. Cl. ............... 429/42; 429/44; 568/6
(58) Field of Classification Search ........... 429/42, 429/300

See application file for complete search history.

(56) References Cited

U.S. PATENT DOCUMENTS

2004/0009389 A1    1/2004    Sakai et al.
2004/0170886 A1    9/2004    Sakamoto
2006/0147805 A1*   7/2006    Iwayasu et al. ........... 429/317

FOREIGN PATENT DOCUMENTS

JP         2890513       4/1991
JP      2004-234947      8/2004

* cited by examiner

*Primary Examiner*—Patrick Ryan
*Assistant Examiner*—David No
(74) *Attorney, Agent, or Firm*—Blakely, Sokoloff, Taylor & Zafman LLP

(57) ABSTRACT

A fuel cell comprises a unit cell having a membrane-like electrode unit including an electrolyte membrane, a fuel electrode consisting essentially of a catalyst layer and a diffusion layer, which are formed in the order mentioned on one surface of the electrolyte membrane, and an air electrode consisting essentially of a catalyst layer and a diffusion layer, which are formed in the order mentioned on the other surface of the electrolyte membrane. The diffusion layer of at least the fuel electrode includes a carbon paper prepared by laminating carbon fibers, and a specified water repellent polymer is arranged to cover the surface of the carbon fiber of the carbon paper or is loaded in the clearance among the carbon fibers.

6 Claims, 2 Drawing Sheets

FUEL CELL

CROSS-REFERENCE TO RELATED APPLICATIONS

This application is based upon and claims the benefit of priority from prior Japanese Patent Application No. 2004-376449, filed Dec. 27, 2004, the entire contents of which are incorporated herein by reference.

BACKGROUND

1. Field

The present invention relates to a fuel cell, particularly, to a fuel cell including a fuel electrode having an improved diffusion layer.

2. Description of the Related Art

A direct-methanol-type fuel cell (DMCF) is constructed to comprise a unit cell including a membrane-like electrode unit, a fuel passageway plate arranged on one surface of the membrane-like electrode unit, and an oxidizing gas passageway plate arranged on the other surface of the membrane-like electrode unit. The membrane-like electrode unit comprises a fuel electrode to which is supplied a methanol aqueous solution as a fuel, an air electrode to which is supplied an oxidizing gas, and a polymer electrolyte membrane interposed between the fuel electrode and the air electrode. The fuel electrode includes a catalyst layer and a diffusion layer having a carbon paper prepared by laminating carbon fibers and arranged on the catalyst layer, the catalyst layer and the diffusion layer being arranged in the order mentioned on one surface of the electrolyte membrane. The air electrode includes a catalyst layer and a diffusion layer having a carbon paper prepared by laminating carbon fibers and arranged on the catalyst layer, the catalyst layer and the diffusion layer being arranged in the order mentioned on the other surface of the electrolyte membrane.

When electric power is generated in the fuel cell of the construction described above by supplying an aqueous solution of methanol used as a fuel into the fuel electrode and by supplying an oxidizing gas such as air into the air electrode, the diffusion layer of mainly the fuel electrode, the diffusion layer having a carbon paper, tends to become clogged with water by capillary action. The diffusion layer clogged with water loses its function as a fluid passageway for allowing the methanol aqueous solution used as a fuel to flow toward the catalyst layer. As a result, the catalyst layer partly fails to have the methanol aqueous solution, which is used as a fuel, supplied thereto, lowering the output of the fuel cell.

Such being the situation, Japanese Patent Disclosure (Kokai) No. 2004-234947 discloses a diffusion layer having a carbon paper prepared by laminating carbon fibers each having the surface covered with a fluoroplastic material such as polytetrafluoroethylene.

However, a carbon fiber processed with a fluoroplastic material exhibits an excessively strong water repellency so as to make it difficult to allow the aqueous fuel to flow into the catalyst layer through the carbon paper. Also, the aqueous fuel once taken into the catalyst layer is locked in by the strong water repellency of the carbon fiber. As a result, it is difficult for the aqueous fuel to flow from the catalyst layer to the outside through the diffusion layer. It follows that it is difficult to allow the aqueous fuel to flow into the catalyst layer in a sufficiently large amount, with the result that the output of the fuel cell is lowered.

DETAILED DESCRIPTION

A fuel cell according to one embodiment of the present invention will now be described in detail with reference to the accompanying drawings.

The fuel cell according to this embodiment of the present invention comprises a unit cell including a membrane-like electrode unit. The membrane-like electrode unit comprises a fuel electrode to which is supplied a methanol aqueous solution as a fuel, an air electrode to which is supplied an oxidizing gas, and an electrolyte membrane interposed between the fuel electrode and the air electrode.

Figure 1:
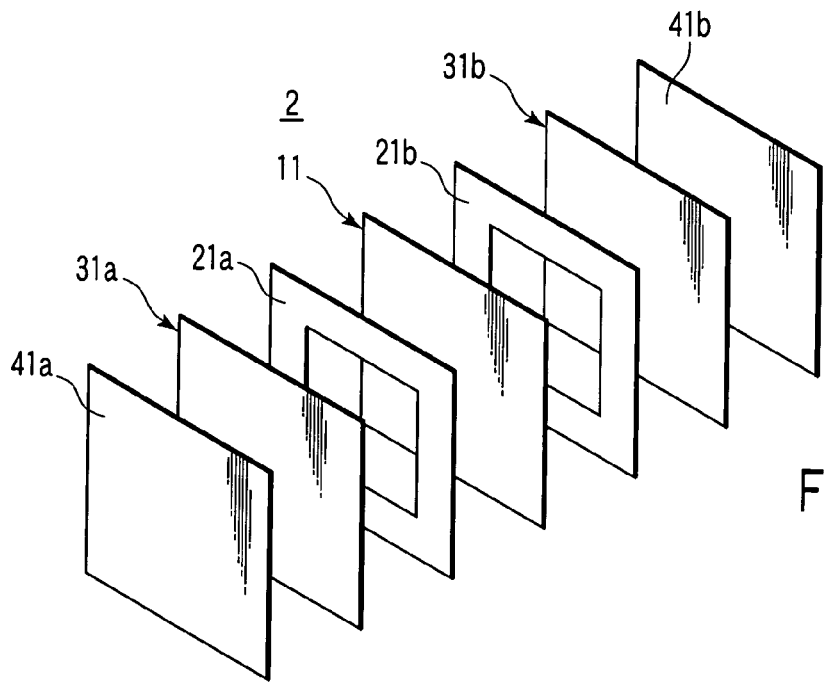
FIG. 1 is an oblique view schematically showing in a dismantled fashion the construction of a unit cell of the fuel cell according to one embodiment of the present invention.
Figure 2:
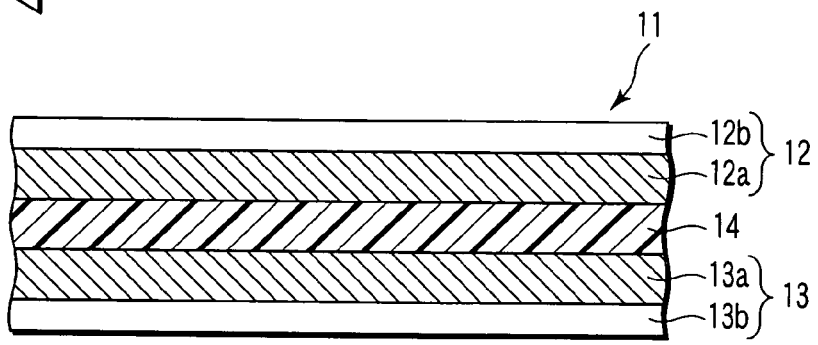
FIG. 2 is a cross-sectional view showing the construction of a membrane-like electrode unit that is incorporated in the unit cell shown in FIG. 1.
Figure 3:
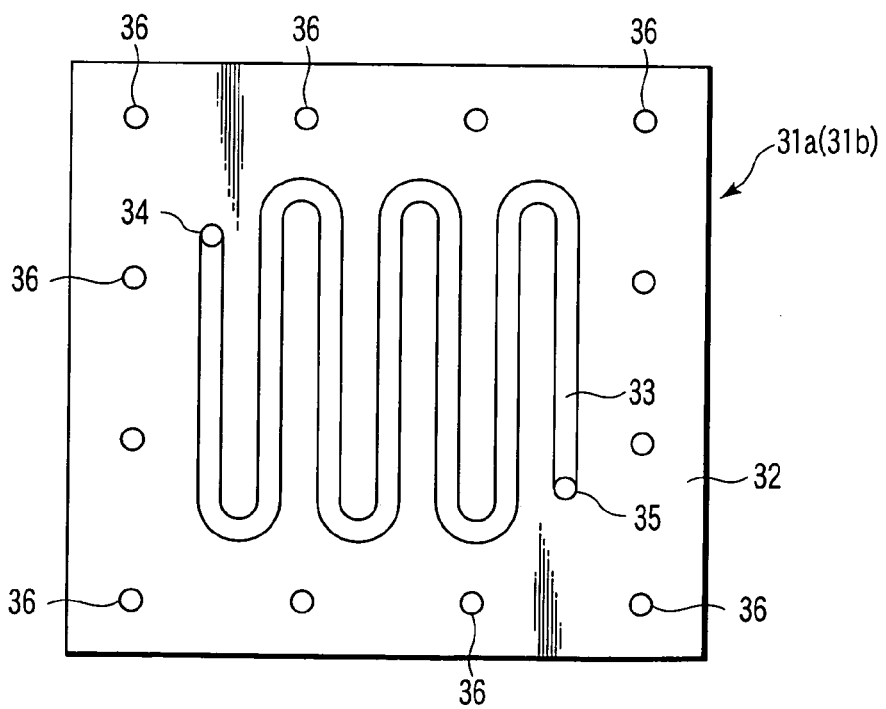
FIG. 3 is a plan view showing the fuel passageway plate and the oxidizing gas passageway plate, which are incorporated in the unit cell shown in FIG. 1.

To be more specific, FIGS. 1 to 3 collectively show schematically the construction of the fuel cell of the present invention. FIG. 1 is an oblique view schematically showing in a dismantled fashion the construction of the unit cell. FIG. 2 is a cross-sectional view showing the membrane-like electrode unit incorporated in the unit cell shown in FIG. 1. Further, FIG. 3 is a plan view showing the fuel passageway plate and the oxidizing gas passageway plate, which are incorporated in the unit cell shown in FIG. 1.

As shown in FIG. 1, a unit cell 1 comprises a membrane-like electrode unit 11. A frame-like sealing material 21*a*, a fuel passageway plate 31*a*, and a current collecting plate 41*a* are laminated one upon the other in the order mentioned on one surface of the membrane-like electrode unit 11. Likewise, a frame-like sealing material 21*b*, an oxidizing gas passageway plate 31*b*, and a current collecting plate 41*b* are laminated one upon the other in the order mentioned on the other surface of the membrane-like electrode unit 11.

As shown in FIG. 2, the membrane-like electrode unit 11 comprises a fuel electrode 12 to which is supplied a fuel, an air electrode 13 to which is supplied an oxidizing gas, and an electrolyte membrane 14 interposed between the electrodes 12 and 13. The fuel electrode 12 comprises a catalyst layer 12*a* that is in contact with the electrolyte membrane 14 and a diffusion layer 12*b* having a carbon paper and laminated on the catalyst layer 12*a*. Likewise, the air electrode 13 comprises a catalyst layer 13*a* that is in contact with the electrolyte membrane 14 and a diffusion layer 13*b* having a carbon paper and laminated on the catalyst layer 13*a*.

As shown in FIG. 3, the fuel passageway plate 31*a* comprises a fuel passageway plate body 32 formed of, for example, carbon, a groove-like fuel passageway 33 formed in a meandering fashion in that portion of the fuel passageway plate body 32 which is positioned to face the frame-like sealing material 21a, a fuel supply port 34 formed at one edge of the fuel passageway 33 in a manner to extend through the fuel passageway body 32, and a fuel discharge port 35 formed at the other edge of the fuel passageway 33 in a manner to extend through the fuel passageway body 32. Likewise, the oxidizing gas passageway plate 31b comprises an oxidizing gas passageway plate body 32 formed of, for example, carbon, a groove-like oxidizing gas passageway 33 formed in a meandering fashion in that portion of the oxidizing gas passageway plate body 32 which is positioned to face the frame-like sealing material 21b, an oxidizing gas supply 34 formed at one edge of the oxidizing gas passageway 33 in a manner to extend through the oxidizing gas passageway body 32, and an oxidizing gas discharge port 35 formed at the other edge of the oxidizing gas passageway 33 in a manner to extend through the oxidizing gas passageway body 32. Holes 36 through which bolts are inserted are formed on the four sides including the four corners of the fuel passageway body 32 or the oxidizing gas passageway body 32.

The diffusion layer 12b of at least the fuel electrode 12 among the fuel electrode 12 and the air electrode 13 includes a carbon paper prepared by laminating carbon fibers, and a water repellent polymer represented by general formula (I) given below is arranged to cover the surface of the carbon fiber of the carbon paper or is loaded in the clearance among the carbon fibers of the carbon paper:

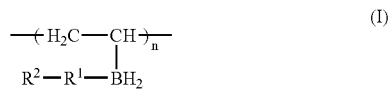

$$-(H_2C-CH)_n- \atop R^2-R^1-BH_2 \qquad (I)$$

where $R^1$ denotes a divalent to tetravalent element, $R^2$ denotes a hydrocarbon functional group or an aromatic functional group, and n denotes an integer of 2 or more.

It is desirable for $R^1$ in general formula (I) to be oxygen, nitrogen, sulfur or phosphorus. It is desirable for $R^2$ in general formula (I) to be a hydrocarbon functional group having 1 to 30 carbon atoms, preferably 1 to 12 carbon atoms, or a substituted or unsubstituted phenyl group. It is acceptable for the hydrocarbon functional group to have an ether bond.

Further, it is desirable for n in general formula (I) to be an integer of 10 to 25,000.

It is desirable for the water repellent polymer represented by general formula (I) to cover the surface of the carbon fiber forming the carbon paper or to be loaded in the clearance among the carbon fibers of the carbon paper in an amount of 0.1 to 60% by volume based on the amount of the carbon paper.

The carbon paper processed with the water repellent polymer can be manufactured by one of the two methods given below. In the first method, the water repellent polymer is kneaded in or blown against the carbon fiber so as to have the surface and the surface layer of the carbon fiber covered with the water repellent polymer, followed by manufacturing a carbon paper by the paper making method by using the carbon fiber having the surface covered with the water repellent polymer. In the second method, a carbon paper is dipped in a solution of the water repellent polymer so as to have the fiber surface of the carbon paper covered with the water repellent polymer or to have the clearance among the fibers loaded with the water repellent polymer.

In the fuel cell according to the embodiment of the present invention, it is possible for the diffusion layer 13b of the air electrode 13 to include a carbon paper prepared by laminating carbon fibers, and it is also possible for a water repellent polymer represented by general formula (I) given previously to be arranged to cover the surface of the carbon fiber of the carbon paper or to be loaded in the clearance among the carbon fibers of the carbon paper.

According to the embodiment of the present invention described above, the surface of the carbon fiber of the carbon paper constituting the diffusion layer of at least the fuel electrode is covered with the water repellent polymer represented by general formula (I) given previously, or the clearance among the carbon fibers is loaded with the water repellent polymer noted above, so as to impart a water repellency to the carbon paper in a good balance. As a result, it is possible to prevent the carbon paper subjected to the water repelling treatment and included in the diffusion layer from being clogged with water when a methanol aqueous solution is supplied as a fuel to the fuel electrode. It is also possible to allow the methanol aqueous solution used as a fuel to flow smoothly into the catalyst layer through the diffusion layer and to allow the unreacted fuel to flow smoothly from the catalyst layer to the outside through the diffusion layer. It follows that it is possible to provide a fuel cell, which exhibits high output characteristics during operation over a long period and which has excellent reliability over a long period.

Further, the surface of the carbon fiber of the carbon paper constituting the diffusion layer of the air electrode is also covered with the water repellent polymer represented by general formula (I) given previously, or the clearance among the carbon fibers is loaded with the water repellent polymer noted above, so as to impart a water repellency to the carbon paper in a good balance. As a result, it is possible to prevent the carbon paper subjected to the water repelling treatment and included in the diffusion layer from being clogged with water when an oxidizing gas containing water, e.g., air, is supplied to the air electrode. It is also possible to allow the air to flow smoothly into the catalyst layer through the diffusion layer. It follows that it is possible to provide a fuel cell, which exhibits high output characteristics during operation over a long period and which has excellent reliability over a long period.

Examples of the present invention will now be described in detail.

SYNTHETIC EXAMPLE 1

A glass reaction vessel having an inner volume of at least 200 mL was housed in each of two SUS autoclaves each having a stirring vane (first and second autoclaves), and these two autoclaves were joined to each other by using an inlet pipe having an opening-closing valve mounted thereon. These two autoclaves were set inside a draft chamber having a local exhaust device joined thereto. Dimethyl formamide in an amount of 100 mL was introduced into the glass reaction vessel housed in the first autoclave while exhausting the draft chamber by operating the local exhaust device, followed by adding 2 g of a silver powder having a fineness not larger than 50 meshes to the dimethyl formamide. Then, 0.5 g of monochloroborane methyl sulfide complex (molecular weight of 110; $4.5 \times 10^{-3}$ mol) was dissolved in 50 mL of dimethyl formamide within the glass reaction vessel housed in the second autoclave, followed by adding 5 mL of triethyl amine to the resultant solution. Further, each of the first and second autoclaves was covered with a lid, and valve of the inlet pipe joining these two autoclaves was closed. Under these conditions, an ethylene gas was supplied into the second autoclave through the inlet pipe at a flow rate of 10 mL/minute until the pressure gauge indicated the pressure of 1.5 atms. Also, the solution within the glass reaction vessel housed in the second autoclave was kept stirred at room temperature for 2 hours with a stirring vane that was rotated at 100 rpm. After completion of the reaction, the valve of the inlet pipe was opened so as to discharge the unreacted ethylene to the first autoclave through the inlet pipe, thereby recovering ethylene in the form of polyethylene.

Further, the lid of the second autoclave was removed so as to take the glass reaction vessel from within the second autoclave, and the reaction mixture was washed three times by using a separatory funnel with a mixed solution consisting of 60 mL of chloroform and 40 mL of water. After the reaction mixture was dried, chloroform was removed by distillation under a reduced pressure so as to obtain a vinyl borane methyl sulfide complex at a yield of 95%.

In the next step, a separable glass reaction round bottomed flask having an inner volume of 100 mL and equipped with an oil bath, a magnetic stirrer, a stirring vane, a nitrogen capillary tube, and a cooling condenser was prepared. Then, a dimethyl formamide solution prepared by dissolving 1.0 g of the vinyl monochloroborane methyl sulfide complex (molecular weight of 102; $9.8 \times 10^{-3}$ mol) obtained by the method described above and 50 mg of azo bis isobutyronitrile in 60 mL of dimethyl formamide was put in the separable glass reaction vessel, and the reaction system was stirred for 4 hours while introducing nitrogen gas into the reaction system, with the oil bath temperature set at 80° C. so as to synthesize a polymerized material (water repellent polymer). The polymerized material dissolved in dimethyl formamide is used as a water repellent described herein later.

It was confirmed by the infrared spectrum data given below, which was obtained by infrared light analysis, that the polymerized material was poly(vinyl borane methyl sulfide complex) having the structural formula (A) given below:

<Infrared Spectrum Data>
2840 cm$^{-1}$ (C—C),
2952 cm$^{-1}$ (CH),
1040 cm$^{-1}$, 1100 cm$^{-1}$ (S—C),
1660 cm$^{-1}$ (B—C),
830 cm$^{-1}$, 920 cm$^{-1}$, 1050 cm$^{-1}$ (B—H).

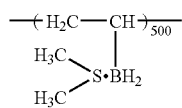

(A)

SYNTHETIC EXAMPLE 2

A polymerized material (water repellent polymer) was synthesized substantially as in Synthetic Example 1, except that 1.1 g of monochloroborane methoxy ethoxy methyl sulfide complex (molecular weight of 258; $4.5 \times 10^{-3}$ mol) was used in place of monochloroborane methyl sulfide complex used in Synthetic Example 1. The polymerized material dissolved in dimethyl formamide is used as a water repellent described herein later.

It was confirmed by infrared spectrum data given below, which was obtained by the infrared light analysis, that the polymerized material was poly(vinyl borane methoxy ethoxy methyl sulfide complex) having the structural formula (B) given below:

<Infrared Spectrum Data>
2840 cm$^{-1}$ (C—C),
2952 cm$^{-1}$ (CH),
1040 cm$^{-1}$, 1100 cm$^{-1}$ (S—C),
1660 cm$^{-1}$ (B—C),
830 cm$^{-1}$, 920 cm$^{-1}$, 1050 cm$^{-1}$ (B—H).

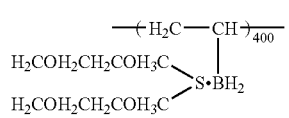

(B)

SYNTHETIC EXAMPLE 3

A polymerized material (water repellent polymer) was synthesized substantially as in Synthetic Example 1, except that 1.1 g of monochloroborane phenyl sulfide complex (molecular weight of 236; $4.5 \times 10^{-3}$ mol) was used in place of monochloroborane methyl sulfide complex used in Synthetic Example 1. Incidentally, the polymerized material dissolved in dimethyl formamide is used as a water repellent described herein later.

It was confirmed by the infrared spectrum data given below, which was obtained by infrared light analysis, that the polymerized material was poly(vinyl borane phenyl sulfide complex) having the structural formula (C) given below:

<Infrared Spectrum Data>
3030 cm$^{-1}$, 3070 cm$^{-1}$ (aromatic ring)
2840 cm$^{-1}$ (C—C),
2952 cm$^{-1}$ (CH),
1040 cm$^{-1}$, 1100 cm$^{-1}$ (S—C),
1660 cm$^{-1}$ (B—C),
830 cm$^{-1}$, 920 cm$^{-1}$, 1050 cm$^{-1}$ (B—H).

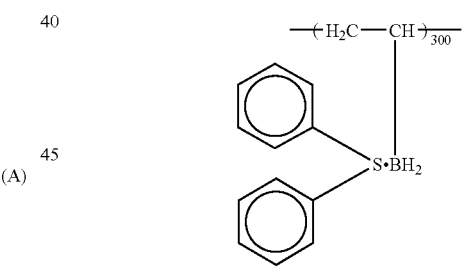

(C)

<Water Repelling Treatment Applied to Carbon Paper>

50 mL of the water repellent prepared in each of Synthetic Examples 1 to 3 was put in a metal vat sized at 15 cm×15 cm. 50 mL of PTFE 30 (trade name of a polytetrafluoroethylene dispersion manufactured by Du Pont Inc., and containing 60% of a solid component having a particle diameter of 0.2 to 0.4 μm) was put in the metal vat (Comparative Example 1). Then, a carbon paper YGP-H-30 (trade name, manufactured by Toray Inc.) was dipped in the metal vat so as to permit the carbon paper to be impregnated with the water repellent, followed by subjecting the carbon paper to the air-drying for 2 hours. Further, the carbon paper impregnated with the water repellent was put in a hot air dryer for subjecting the carbon paper to treatment with hot air at 70° C. for 4 hours, followed by taking the carbon paper out of the hot air dryer so as to bring the temperature of the carbon paper back to room temperature, thereby obtaining a carbon paper subjected to the water repelling treatment. The water repellent prepared in each of Synthetic Examples 1 to 3 was found to have covered and have been loaded in the carbon paper in an amount of 5% by volume. Also, polytetrafluoroethylene was found to have covered and to have been loaded in the carbon paper in an amount of 5% by volume.

<Assembly of Unit Cell>

A Naphion 112 membrane (trade name of a perfluoroalkyl sulfone membrane manufactured by Du Pont Inc.) was used as an electrolyte membrane. A platinum-ruthenium catalyst layer and a diffusion layer formed of a carbon powder and a carbon paper subjected to the water repelling treatment described above were subjected in the order mentioned to a thermal contact bonding to one surface of the perfluoroalkyl sulfone membrane (electrolyte membrane) so as to form an anode (fuel electrode). Further, a platinum catalyst layer and a diffusion layer formed of a carbon powder and a carbon paper subjected to the water repelling treatment described above were subjected in the order mentioned to a thermal contact bonding to the other surface of the perfluoroalkyl sulfone membrane (electrolyte membrane) so as to form a cathode (air electrode), thereby manufacturing four membrane-like electrode units each having an electrode area of 5 cm$^2$. In the next step, these membrane-like electrode units were sandwiched between two separators made of carbon and having a column flow fluid passageway, followed by fastening the resultant structure by using bolts so as to prepare four kinds of unit cells for evaluation.

<Evaluation of Unit Cell>

Figure 4:
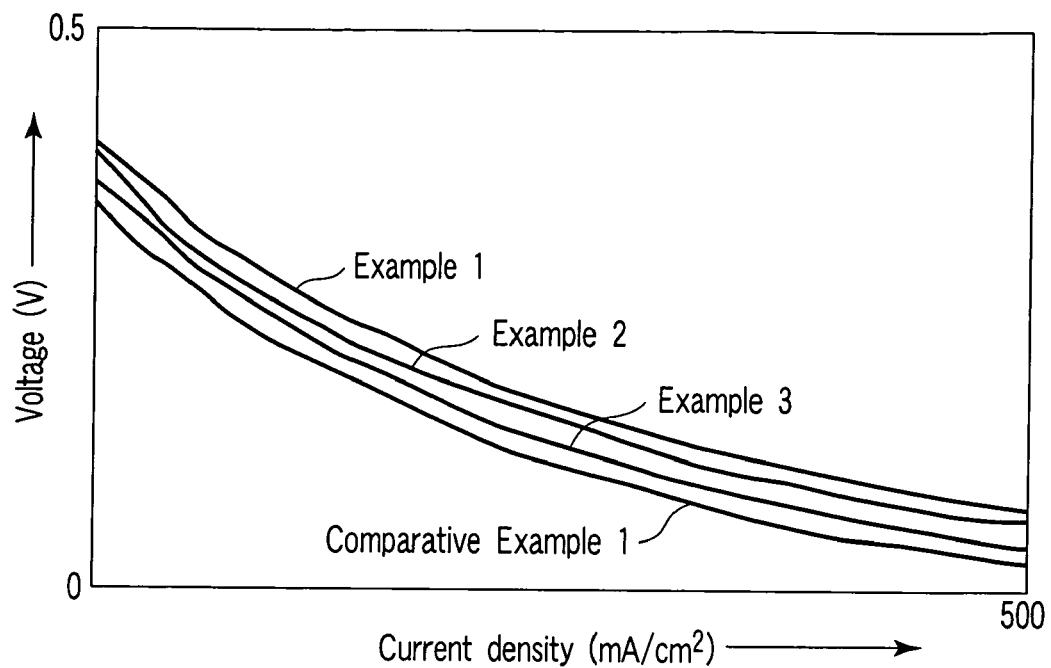
FIG. 4 is a graph showing the current-voltage curves at 70° C. of the unit cell for evaluation in each of Examples 1 to 3 and Comparative Example 1.

Each of the unit cells thus prepared was mounted on a fuel cell evaluating apparatus. Then, a methanol aqueous solution having a methanol concentration of 5% by weight was allowed to flow into the anode side of each unit cell at a flow rate of 7 mL/min, and air was supplied into the cathode side of each unit cell at a flow rate of 12 mL/min so as to examine the current-voltage curve at the temperature of 70° C. FIG. 4 is a graph showing the experimental data.

As apparent from the graph of FIG. 4, the unit cell for evaluation for each of Examples 1 to 3, which was equipped with a diffusion layer comprising a carbon paper subjected to the treatment with the water repellent polymer prepared in each of Synthetic Examples 1 to 3, was found to exhibit current-voltage characteristics higher than those of the unit cell for evaluation for Comparative Example 1, which was equipped with a diffusion layer comprising a carbon paper subjected to a water repelling treatment with polytetrafluoroethylene. The experimental data clearly support that the unit cell for the Examples of the present invention makes it possible to exhibit the effect of generating electric power with a higher output.

EXAMPLES 4 TO 6 AND COMPARATIVE EXAMPLE 2

Figure 5:
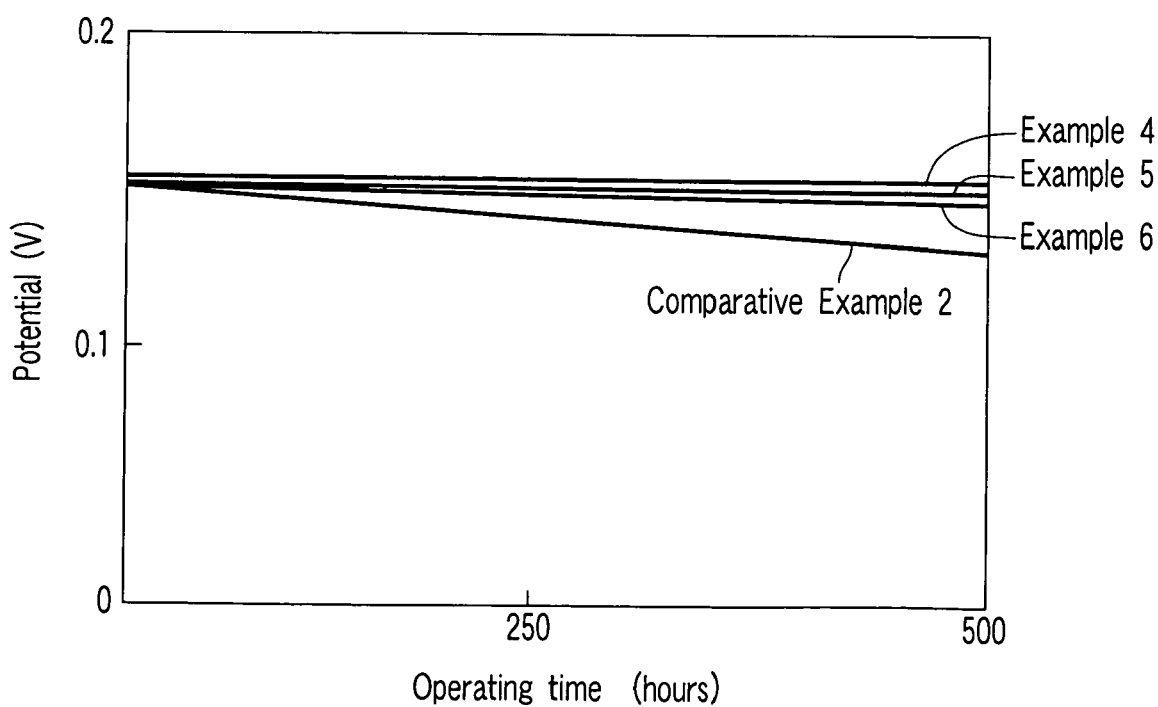
FIG. 5 is a graph showing the change in voltage of the unit cell for evaluation in each of Examples 4 to 6 and Comparative Example 2, covering the case where the unit cell was operated over a long time while maintaining a constant current density.

A methanol aqueous solution (fuel) containing 5% by weight of methanol was supplied to the anode side of a unit cell similar to that used in each of Examples 1 to 3 and Comparative Example 1 at a fuel flow rate of 7 mL/min. Air used as an oxidizing agent was supplied to the cathode side of the unit cell at an air flow rate of 12 mL/min. Under these conditions, the unit cell was operated for 500 hours at an operating rate of 5 hours/day at a temperature of 70° C. while maintaining a constant current density of 200 mA/cm$^2$ so as to observe the change with time in potential. FIG. 5 is a graph showing the experimental data.

Also, the potential retention rate was obtained by the formula given below:

Potential retention rate (%)=$(V_2/V_1) \times 100$ where $V_1$ denotes the potential immediately after start-up of the test, and $V_2$ denotes the potential after operation for 1,500 hours.

Table 1 shows the results:

TABLE 1

|  | Water repellent | Potential retention rate (%) |
| --- | --- | --- |
| Example 4 | Poly (vinyl borane methyl sulfide complex) | 95 |
| Example 5 | Poly (vinyl borane methoxy ethoxy methyl sulfide complex) | 94 |
| Example 6 | Poly (vinyl borane phenyl sulfide complex) | 93 |
| Comparative Example 2 | Polytetrafluoroethylene; | 75 |

As is apparent from FIG. 5 and Table 1, the unit cell for evaluation for each of Examples 4 to 6, which comprised the diffusion layer including a carbon paper treated with a water repellent polymer synthesized in each of Synthetic Examples 1 to 3 was found to exhibit a high potential retention rate even after power generating operation for a long period, compared with the unit cell for evaluation for Comparative Example 2, which comprised the diffusion layer including a carbon paper subjected to a water repelling treatment with polytetrafluoroethylene.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell comprising a unit cell having a membrane-like electrode unit including an electrolyte membrane, a fuel electrode having a methanol aqueous solution supplied thereto as a fuel, and consisting essentially of a catalyst layer and a diffusion layer, which are formed in the order mentioned on one surface of the electrolyte membrane, and an air electrode having an oxidizing gas supplied thereto, and consisting essentially of a catalyst layer and a diffusion layer, which are formed in the order mentioned on the other surface of the electrolyte membrane, wherein the diffusion layer of at least the fuel electrode among the fuel electrode and the air electrode includes a carbon paper prepared by laminating carbon fibers, and a water repellent polymer represented by general formula (I) given below is arranged to cover the surface of the carbon fiber of the carbon paper or is loaded in the clearance among the carbon fibers of the carbon paper:

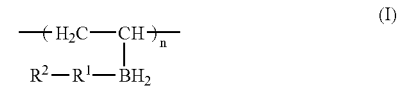

where $R^1$ denotes a divalent to tetravalent element, $R^2$ denotes a hydrocarbon functional group or an aromatic functional group, and n denotes an integer of 2 or more.

2. The fuel cell according to claim 1, wherein $R^1$ in general formula (I) represents oxygen, nitrogen, sulfur or phosphorus.

3. The fuel cell according to claim 1, wherein $R^2$ in general formula (I) represents a hydrocarbon functional group having 1 to 30 carbon atoms, or a substituted or unsubstituted phenyl group.

4. The fuel cell according to claim 1, wherein n in general formula (I) represents an integer of 10 to 25,000.

5. The fuel cell according to claim 1, wherein the water repellent polymer is positioned to cover at least one of the surface of the carbon fiber constituting the carbon paper and the surface layer of the carbon fiber or is loaded in the clearance among the carbon fibers in an amount of 0.1 to 60% by volume.

6. The fuel cell according to claim 1, wherein the diffusion layer included in each of the fuel electrode and the air electrode includes a carbon paper prepared by laminating carbon fibers, and the water repellent polymer represented by general formula (I) is positioned to cover at least one of the surface of the fiber and the surface layer of the fiber or is loaded in the clearance among the fibers.

* * * * *